Nov. 14, 1950     R. BREZEK     2,529,995
ARRANGEMENT OF MUFFLERS AND VEHICLE
BODY CHAMBERS THEREFOR
Filed Feb. 27, 1948
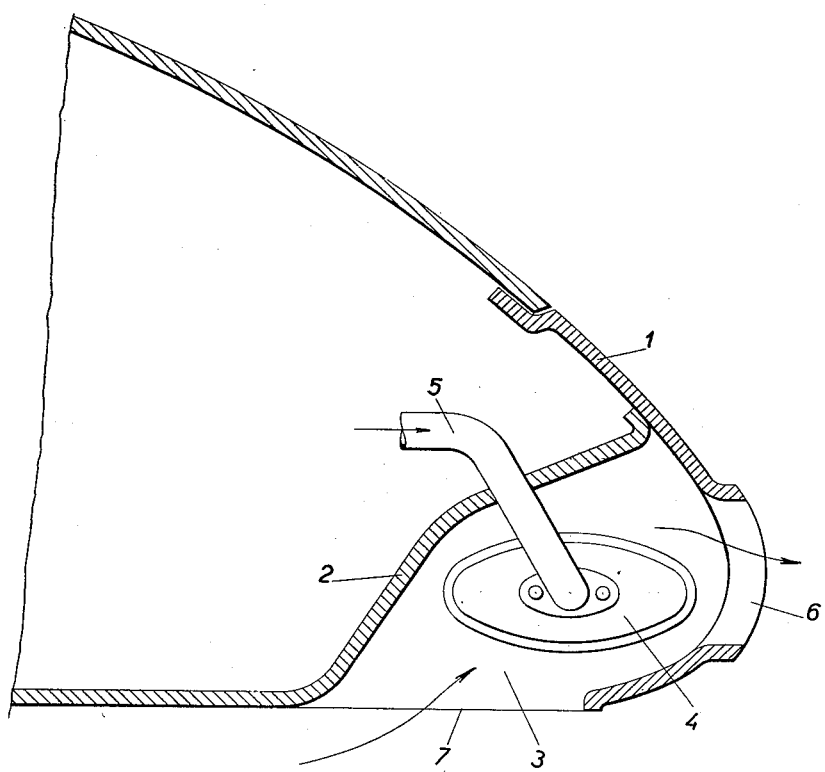
Inventor:
Rudolf Brezek,
by Singer, Ehlert, Stern & Carlberg
Attorneys.

Patented Nov. 14, 1950

2,529,995

UNITED STATES PATENT OFFICE 2,529,995

ARRANGEMENT OF MUFFLERS AND VEHICLE BODY CHAMBERS THEREFOR

Rudolf Březek, Prague-Smichov, Czechoslovakia, assignor to Tatra narodni podnik, Koprivnice, Czechoslovakia Application February 27, 1948, Serial No. 11,785
In Czechoslovakia May 2, 1946

Section 1, Public Law 690, August 8, 1946
Patent expires May 2, 1966

1 Claim. (Cl. 180—54)

In motor vehicles with rear engine and streamline body the space around the engine and therebeneath is extremely limited so that the arrangement of the muffler meets with great difficulties.

According to the present invention the muffler in such case is preferably arranged in such manner as to lie across the vehicle at the very end of the vehicle body in a space separated from the engine space by a wall but open at the bottom, an aperture being provided in the rear face of the vehicle body wherethrough the air may escape which from underneath penetrates into said space.

The accompanying drawing shows, by way of example, an embodiment of the object of the present invention.

In the end 1 of the streamline body behind the wall 2 separating the engine space a space 3 is formed wherein the muffler 4 is arranged and connected to the engine by the exhaust tube 5. At the rear face of the vehicle body an aperture 6 is provided wherethrough the air escapes out of the space 3 into which it is driven through the aperture 7 at the body bottom. Thus said space is thoroughly aerated and prevents heat being transmitted into the engine space.

I claim:

A housing arrangement for a muffler in motor vehicles having a streamlined body and a rear engine compartment, comprising a chamber wherein the muffler is adapted to lie transversely of the vehicle and a partition wall separating the muffler chamber at said rear end of the streamlined body from the engine compartment, said muffler chamber having an opening at the bottom in its forward portion and an opening at said rear end of the streamlined body, through which openings cooling air may enter and escape.

RUDOLF BŘEŽEK.

REFERENCES CITED

The following references are of record in the file of this patent:

UNITED STATES PATENTS

| Number | Name | Date |
|---|---|---|
| 2,143,889 | Ledwinka | Jan. 17, 1939 |